United States Patent

[11] 3,629,716

[72] Inventor Donald F. Dimon
Pittsburgh, Pa.
[21] Appl. No. 809,675
[22] Filed Mar. 24, 1969
[45] Patented Dec. 21, 1971
[73] Assignee Infinite Q Corporation
Pittsburgh, Pa.

[54] METHOD AND APPARATUS OF INFINITE Q DETECTION

12 Claims, 12 Drawing Figs.

[52] U.S. Cl. .................................................... 329/50, 325/419, 331/23, 332/122
[51] Int. Cl. .................................................... H03d 3/18
[50] Field of Search .................................................... 331/18, 23, 25; 332/50, 122; 325/419

[56] References Cited

UNITED STATES PATENTS

| | | | |
|---|---|---|---|
| 3,209,271 | 9/1965 | Smith | 329/50 X |
| 3,218,572 | 11/1965 | Dimmick | 331/25 X |
| 3,308,393 | 3/1967 | Lind | 331/25 X |
| 3,328,719 | 6/1967 | De Lisle et al. | 331/25 X |
| 3,346,815 | 10/1967 | Haggai | 329/122 |
| 3,371,281 | 2/1968 | Powell | 329/122 X |

*Primary Examiner*—Alfred L. Brody
*Attorney*—Carothers and Carothers

ABSTRACT: The method of maintaining positive locked-on detection with instantaneous locked-on filter tracking of a complex modulated carrier signal by instantaneous employment of the complex modulation content of the signal to respectively provide complex-angularly locked-loop detection of any modulated carrier and exclude all other signals and noise not a part of the modulated carrier signal to provide detection of infinite Q capabilities and the structure thereof.

Locked-on tracking is obtained by instantaneously and continuously filtering the modulated carrier signal by synchronously filter-tracking the same with the modulation excursions thereof.

To maintain synchronization with the unfiltered modulated carrier signal, synchronous demodulation is preferred whereby a matched signal (matched to the filtered signal) is generated and synchronously demodulated with the filtered signal and the modulation excursion or content signals of both the filtered modulated carrier and the matched modulated carrier are used to produce output signal that is employed to instantaneously control the parameters of the tracking filter and the parameters of the matched signal generator, thereby maintaining synchronization in continuous tracking and positive locked-on detection (complex-angularly locked-loop detection).

The unfiltered modulated signal is filtered through a time variant filter to produce the carrier signal with its modulations alone. The filter and the generator employed for producing the synchronized matched modulated carrier signal, are each preferably identical structures with the exception that the generator does not have an external input connection.

The filter and generator preferably include as one example embodiment, a connected closed loop series circuit having a multiple input inverter and a first and second integrator, each integrator having variable parameters that are controlled by the modulation content of the filtered signal obtained through a detection process.

INVENTOR.
DONALD F. DIMON
BY
CAROTHERS & CAROTHERS
HIS ATTORNEYS

INVENTOR.
DONALD F. DIMON
BY
CAROTHERS & CAROTHERS
HIS ATTORNEYS

INVENTOR.
DONALD F. DIMON
BY
CAROTHERS & CAROTHERS
HIS ATTORNEYS

INVENTOR.
DONALD F. DIMON
BY
CAROTHERS & CAROTHERS
HIS ATTORNEYS

INVENTOR.
DONALD F. DIMON
BY
CAROTHERS & CAROTHERS
HIS ATTORNEYS

INVENTOR.
DONALD F. DIMON
BY
CAROTHERS & CAROTHERS
HIS ATTORNEYS

METHOD AND APPARATUS OF INFINITE Q DETECTION

BACKGROUND OF THE INVENTION

Applicant's U.S. Pat. No. 3,196,350 issued July 20, 1965, entitled, "Narrow Bandwidth High Q Communication System," is incorporated herein by reference for prior art teaching and discloses the use of an AM time variant tracking filter wherein the signal received is filtered to produce a carrier that is demodulated and the demodulated carrier is compared to a reference carrier to provide an output signal employed to control the time variant filter parameters. This output signal is improved but the filter cannot track the AM carrier signal when it drifts or otherwise varies in angular or complex modulations or due to any other outside force effective to cause such a change in the AM input carrier. The filter of U.S. Pat. No. 3,196,350 will not phase lock on an incoming signal; it will only compare the same to a reference carrier.

Each of the forces creating a shift in the AM carrier frequency causes that portion of the signal to be lost which in some instances could be vital to the intelligence transmitted. Although the parameters of the filter help to bring in an improved AM signal, it is insufficient for and can not provide positive tracking. The AM filter of this prior art excludes all FM or angular modulations or excursions thereby requiring the signal tracking bandwidth to be much broader than desired in order to track the AM modulated carrier which inevitably will have phase or angular excursions or shifts whether wanted or not. Thus the system Q is much lower than desired and noise is not eliminated.

The prior art system cannot provide a sufficiently narrow filter tracking bandwidth, and even if this were possible, then it could not adequately filter track the modulated carrier signal as it cannot phase lock thereon.

On the other hand, the conventional phase locked-loop detection as heretofore known is provided only for the detection of FM intelligence and it has not been shown how one might employ it for the detection of AM or complex intelligence which is modulated on a carrier which drifts and has other angular modulation content which renders AM detection difficult and impractical for critical applications. Conventional phase lock-loop detection is also limited in that it does not have the ability to detect very rapid signal level changes, when narrow bandwidths are employed.

SUMMARY OF THE INVENTION

The method and apparatus of the present invention provide absolute or positive locked-on detection of a modulated carrier with infinite Q capabilities which may be incorporated.

To maintain positive locked-on detection of the modulated carrier, the parameters of a time variant detector or detection means are instantaneously varied by the complex angular content of the carrier signal to provide complex-angularly locked-loop detection of any modulated carrier.

The detection may be empowered with higher Q capabilities by filtering out unwanted signals and noise in the working bandwidth, not a part of the modulated carrier to be detected. This filtering may be done prior or subsequent to the actual step of detection.

For actual infinite Q detection capabilities, the filter is made time variant to provide a tracking filter with variable parameters which are instantaneously varied by the modulation content of the modulated carrier to be filtered to exclude all other signals and noise not a part of the modulated carrier itself.

The filtering method of the present invention provides filter tracking with true infinite Q capabilities which are limited only by the inabilities or inadequacies of present day electronic components and apparatus.

The present invention has for a principal object the method and apparatus for tracking AM, FM or complex modulated signals, by synchronously locking onto and filtering the instantaneous wave form of the incoming or external modulated carrier signal by using the detected modulation contents to instantaneously control the parameters of the time variant filter and exclude all other signals and noise not a part of the selected or initially transmitted modulated carrier signal. By demodulating the filtered (preferably synchronous demodulation with a synchronously matched signal) signal and employing the detected modulations to vary the tracking parameters in the time variant filter, the carrier signal can be positively locked onto for tracking, and every portion of the detected signal is complete without noise or any extraneous signals.

Another important object of this invention is the provision of method and apparatus for providing a time variant filter and a time variant oscillator or generator, which are preferably matched or exact duplicates of each other, differing only in the respect that the filter is provided with a connection for receiving an external input signal. These duplicate structures are used together. The time variant filter and the time variant oscillator being exact and matched duplicates permits the latter to generate a signal exactly the same as that which would pass through the filter and this is considered to be novel per se. The modulated carrier signal from each are then preferably synchronously demodulated or detected together through analog multipliers and summing networks to provide output signal that is used to control the parameters of the time variant filter as well as those of the time variant oscillator so that the signals from each are constantly and instantly maintained in locked synchronization and cannot depart from each other. This mode of maintaining locked synchronization in filter tracking is novel and positive, and produces an accurate signal detection.

Another object of this invention is the provision of a time variant filter and time variant oscillator that are both provided with variable parameters for angular as well as amplitude filter tracking of the AM, FM or complex signals which is not possible with the prior art. This permits accurate tracking of a very weak signal which is masked by other signals and noise. The filtered signal and the matched oscillator signal are synchronously detected to provide instantaneous angular and amplitude error signals which are usually amplified to produce the desired control signals to control the time variant filter and oscillator variable parameters for filter tracking. Differential or lead networks and amplifiers are preferably employed in the servo loops to improve the stability of the servo loops and the allowable servo loop gain.

Another object of this invention is the provision of a divider, fixed parameter filter and time variant oscillator for amplitude filter tracking of AM signals which is not possible with the prior art. This permits accurate tracking of a very weak AM signal which is masked by other signals and noise. The filtered signal and the matched oscillator signal are synchronously detected to provide instantaneous angular and amplitude error signals which are amplified to produce the desired control signals to control the divider and oscillator parameters for filter tracking. The fixed parameter filter may be a very narrow bandwidth structure such as quartz crystal type, for example. The servo loops employ preferably lead networks and amplifiers to improve the stability and allowable loop gain.

Another object of this invention is the provision of a time variant filter and time variant oscillator that are both provided with variable parameters for angular as well as amplitude filter tracking of AM, FM or complex signals which is not possible with the prior art. This permits accurate tracking of a very weak signal which is masked by other signals and noise. The filtered signal and the corresponding oscillator signal are synchronously detected to provide instantaneous angular and amplitude error signals which are usually amplified to produce the desired control signals to control the time variant filter and oscillator variable parameters for filter tracking. The oscillator and filter have identical parameter controls as to their respective time axis, but have opposite parameter controls for amplitude, such that the product of the amplitude of the oscillator signal and the amplitude of the received filter tracked signal is constant.

Another object of this invention is the provision of a frequency converter, divider, fixed parameter filter, fixed generator and a time variant generator for amplitude filter tracking of AM signals which is not possible with the prior art. This permits accurate tracking of a very weak AM signal which is masked by other signals and noise. The received signal is converted in frequency determined by a time variant generator, passes through a divider and is filtered by a very narrow band fixed parameter filter preferably a quartz crystal type and is compared to the signal output of a fixed generator matched to the fixed filter in a synchronous demodulator to produce amplitude and angular error signals which are usually amplified to produce control signals to control the divider and oscillator parameters.

Another object of this invention is the provision of a number of time variant filters and matched time variant oscillators, and one or more analog or digital computers for synchronous detection comparison of the outputs of each time variant filter and attendant time variant oscillator, said computer or computers providing control signals to adjust the filter and oscillator parameters.

Another object of this invention is the provision of an analog divider or controllable limiter, a time variant generator and a synchronous demodulator to receive and track AM, FM or other angular or complex modulated signals for signals for improvements over prior art in phase-locked-loop signal detection, by demodulation of amplitude as well as angular modulation content.

Other objects and advantages appear in the following description and claims.

The accompanying drawings show, for the purpose of exemplification without limiting the invention or the claims thereto, certain practical embodiments illustrating the principles of this invention wherein:

FIG. 1 is a generalized block diagram of a tracking filter network for locked-on tracking of an unfiltered complex modulated carrier signal in accordance with the teachings of the present invention by synchronously employing the instant parameters of the modulation content signal and is utilized for both AM and FM or any complexly modulated signal.

FIG. 2 is a second generalized block diagram of a tracking filter network for locked-on synchronized tracking of an unfiltered modulated carrier signal wherein the instant parameters of a matched generated signal and the filtered signal itself are continuously and synchronously compared to provide output signal for instantaneous and continuous variation of the matched signal generator parameters and the time variant filter parameters utilized for either AM or FM or any complex modulated signals.

Figure 5:
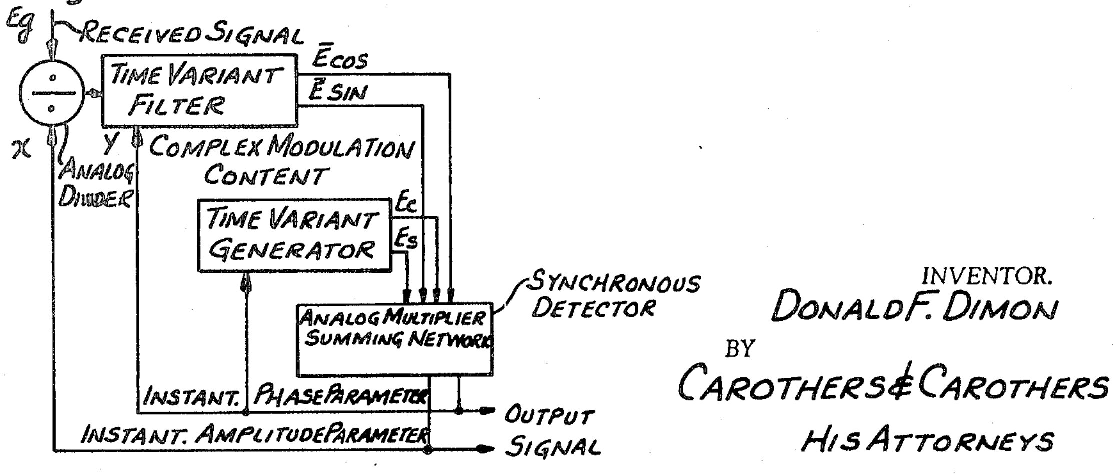
FIG. 5 is a generalized block diagram of one embodiment of the generic filter network diagram illustrated in FIGS. 1 and 2 for use with angular modulated or amplitude modulated (AM) carrier signals, either alone or combined, or other complex modulated signals wherein the amplitude modulations are substantially divided out before filtering.
Figure 6:
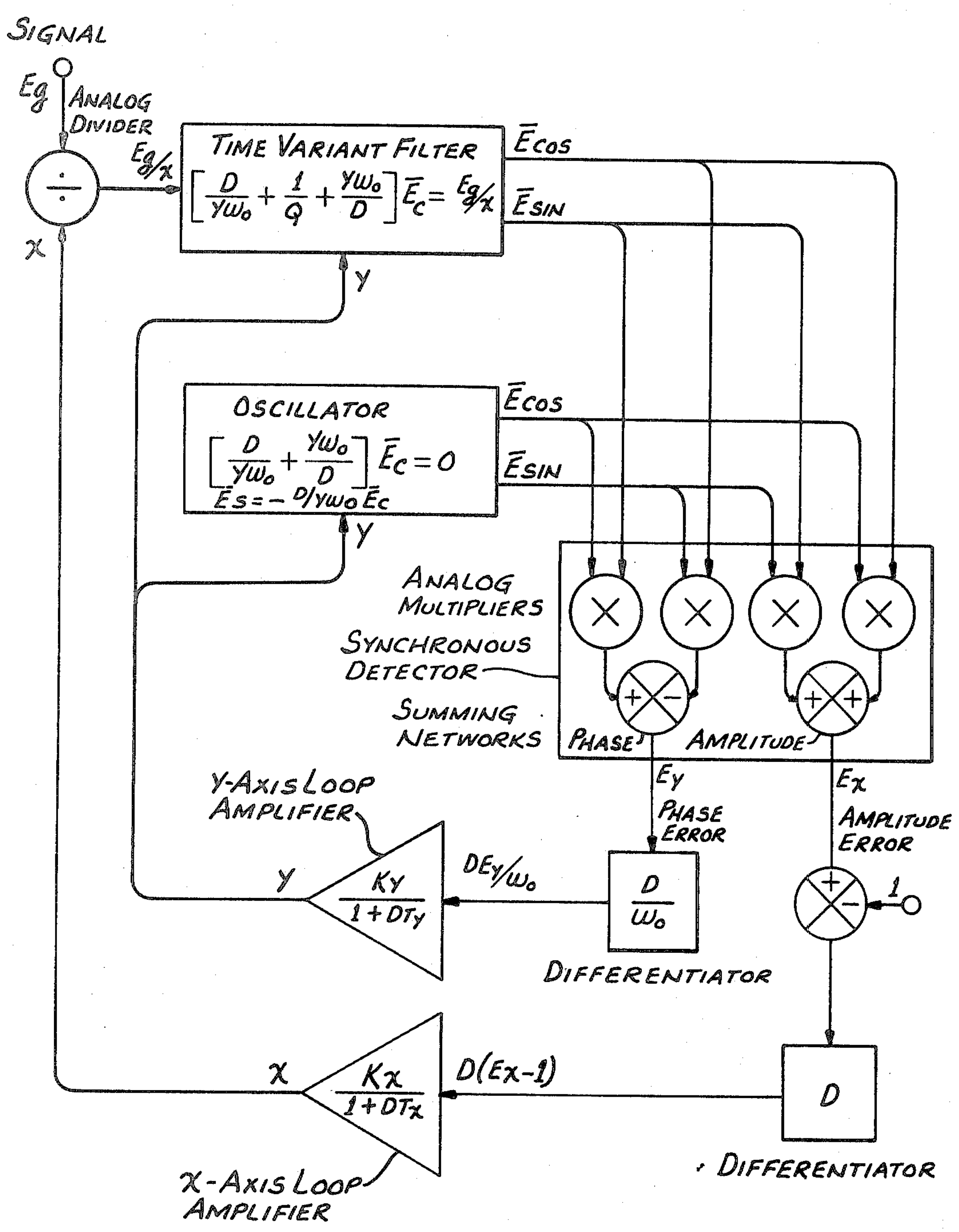

FIG. 6 is a block diagram in greater detail of one embodiment of a tracking filter network for use with AM and FM or complex modulated carrier signals which provides independent amplitude and phase angle filtering parameter control signals similar to that of FIG. 5 from the filtered modulated carrier signal and the generated matched carrier signal, both of which are synchronously compared to furnish output signals of phase and amplitude difference that when amplified are connected in servo loops of high gains and stability which act instantaneously on the time variant oscillator and filter to phase lock their outputs and on the analog divider of the incoming filter signal to track the AM excursions.

Figure 7:
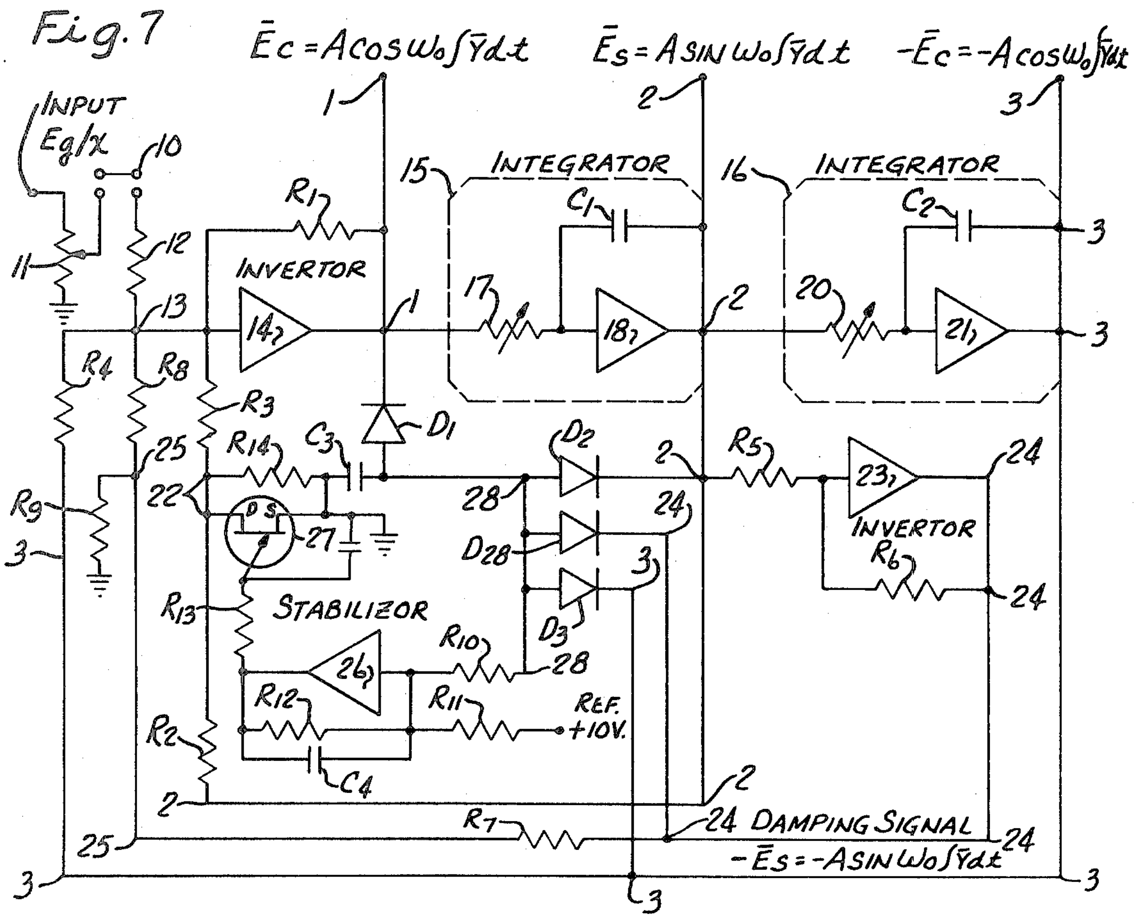

FIG. 7 is a block circuit diagram of a filter and oscillator which are one and the same.

Figure 8:
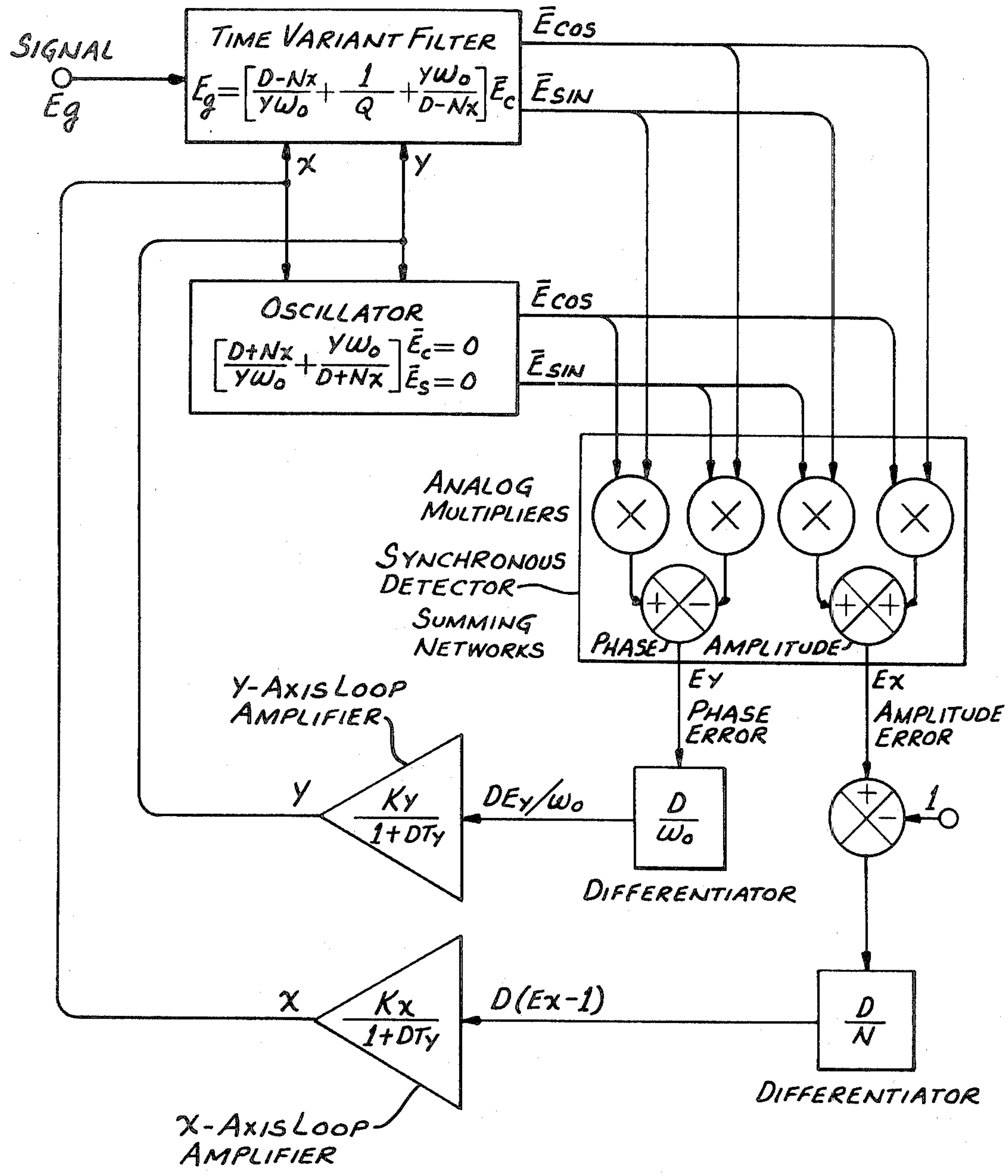

FIG. 8 is a block diagram of another embodiment of the filter network of the present invention for use with AM, angular modulated, such as FM, or complex modulated carrier signals wherein the filtered signal contains all its original modulation content and not merely the angular modulations with minute unfiltered amplitude tracking error modulations (without the full amplitude modulations) as is done in the network of FIG. 6.

Figure 9:
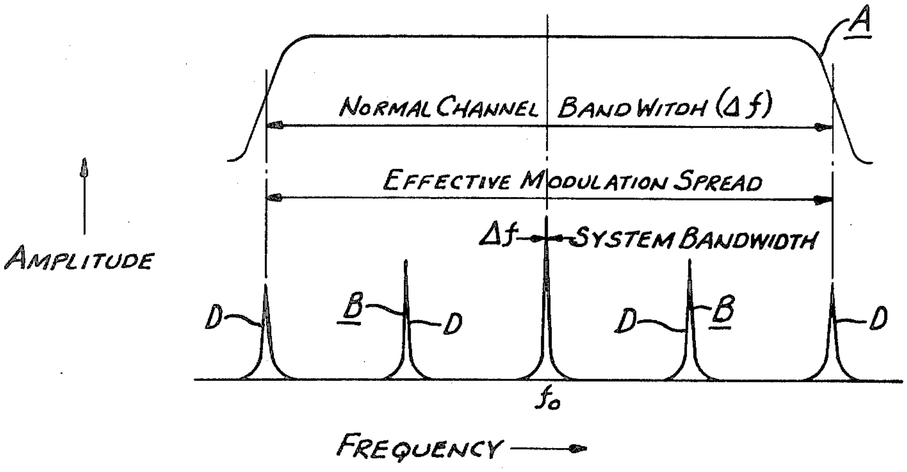

FIG. 9 is a graphical illustration comparing a conventional AM detection bandwidth with that of the present invention for one given instant.

Figure 10:
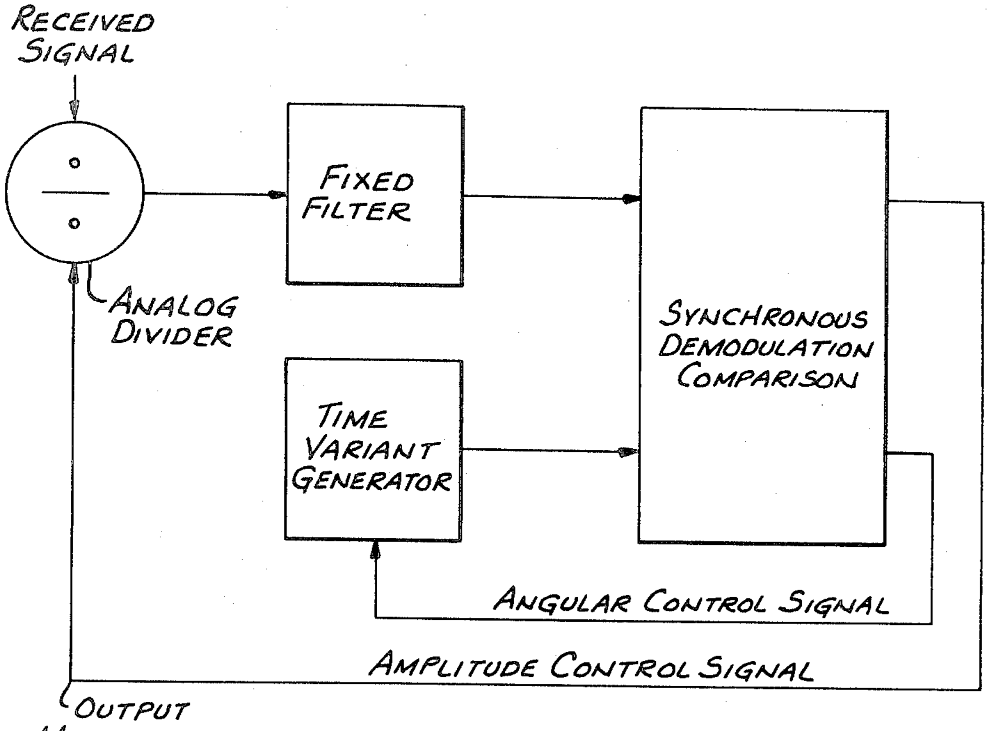

FIG. 10 is a block diagram illustrating another embodiment of the present invention for detection of AM signals having small angular modulation content.

Figure 11:
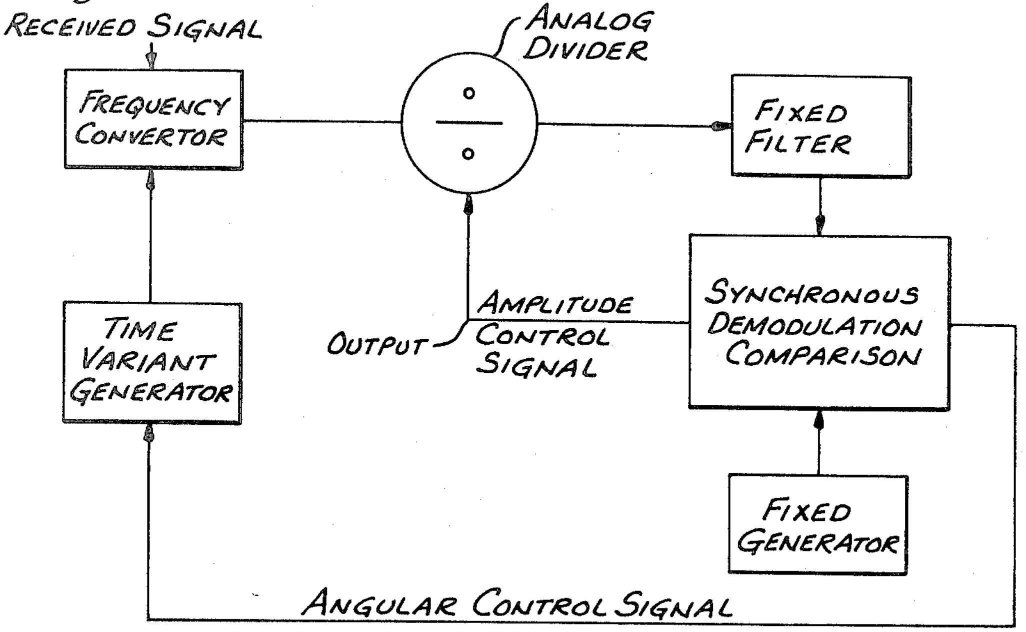

FIG. 11 is a block diagram illustrating another embodiment of the present invention wherein the received signal is converted to a fixed frequency of a fixed generator for detection of signals having slow angular modulation content.

Figure 12:
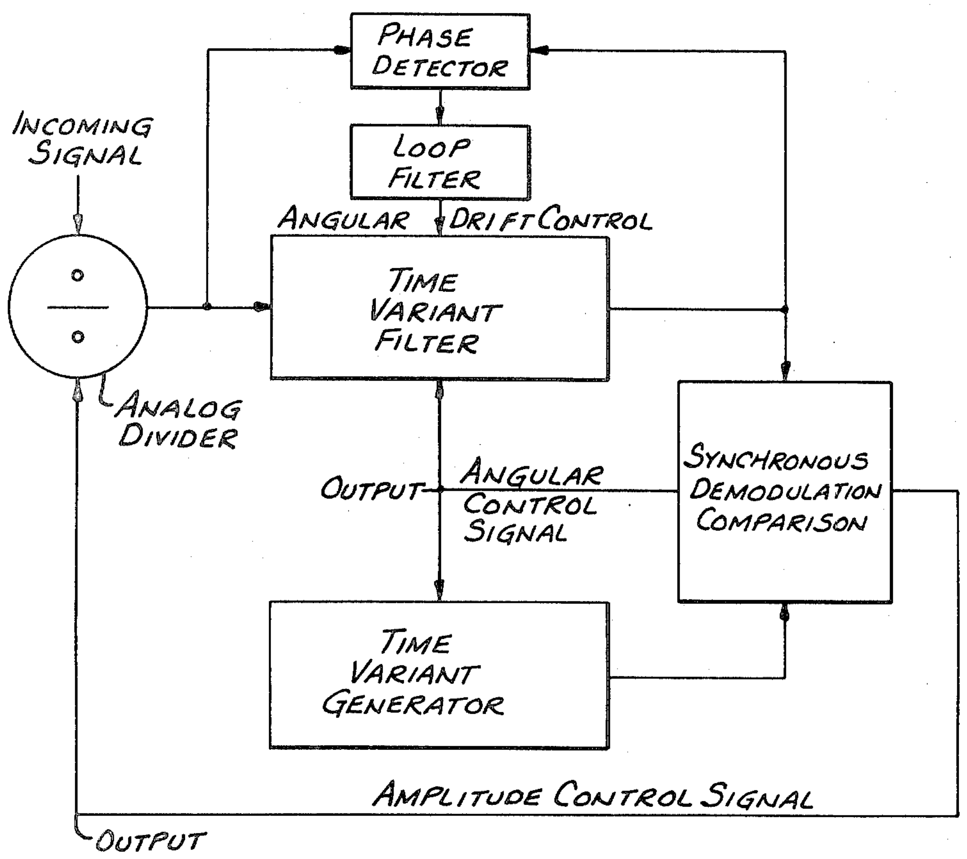

FIG. 12 is a block diagram illustrating another embodiment of the present invention wherein a matched time variant filter and generator are regulated to compensate for component drift or mismatch.

Referring to the drawings, a typical infinite Q narrow bandwidth time variant tracking filter constituting the present invention is shown in each figure. This tracking filter has the properties of accepting and demodulating a very narrow band of signals having complex modulation content. That is, the input signal to this tracking filter has or may have amplitude modulation as well as frequency, phase or other angle modulation content. This was not permissible in the prior art. The tracking filter will permit only a very restricted bandwidth of energy to activate it, and it will track and follow the instantaneous modulation contents with one or more simultaneous servo systems which lock on and follow the exact waveform thereby eliminating all extraneous signals or noise.

Figure 1:
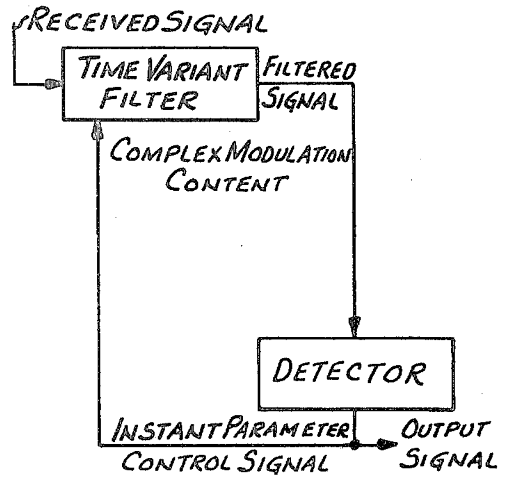

The network of FIG. 1 is generic to the time variant filter of the present invention and each and every other block diagram herein illustrated which employs a time variant filter. In this figure the time variant filter output signal is detected to supply a servo loop control signal to phase lock the time variant filter parameters to the modulated carrier of the unfiltered waveform and permit it to instantly vary with or track the carriers amplitude and angular modulation excursions such that only a very narrow bandwidth of modulated signals pass through the filter at any given instant thereby excluding extraneous signals and noise. Amplitude and phase angle factors are detected and use to instantaneously phase lock the filter on the modulated carrier signal thereby gating or blocking out the remainder of the unfiltered signal within the transmission bandwidth.

Figure 2:
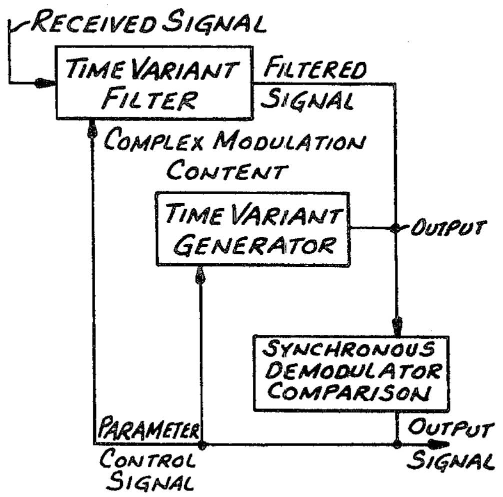

In FIG. 2 the filter tracking of the modulated carrier with the modulation content thereof in the form of a control signal is accomplished by generating a matched signal, which is a signal that is continually varied to match the filtered modulated signal, and with an oscillator that is preferably matched in structure with the time variant filter, and continuously and synchronously comparing the output of the oscillator with the filter output. The compared signals are synchronously demodulated to produce a modular parameter control effective simultaneously and instantly on the time variant filter and oscillator to lock them both on their respective signals and instantaneously follow and synchronously filter track the modulated signal found in the unfiltered incoming signal content.

Figure 3:
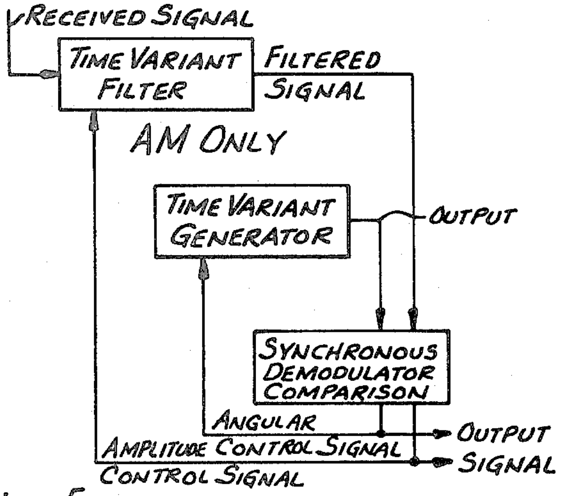
FIG. 3 is a generalized block diagram of a tracking filter network for tracking an AM signal only and providing a locked-on synchronized tracking of the unfiltered modulated carrier signal by comparing instantaneously the modulation content of both the filtered and matched modulated signals from the time variant filter and generator respectively.

In the AM circuit of FIG. 3, the synchronous demodulation output is broken down into two separate output signals to independently control the time variant filter and the oscillator generating the matching signal. One modulation parameter control signal from the synchronous demodulation is selected as a phase lock parameter control for the oscillator generating the matched signal and an amplitude parameter control is selected for the filter. In this instance, as in FIGS. 1 and 2, the signal is locked on the modulated carrier signal of the unfiltered input and maintained in synchronous control following the instantaneous changes of the AM signal. The circuit of FIG. 3 would not operate to detect FM or other angular modulated signals.

Figure 4:
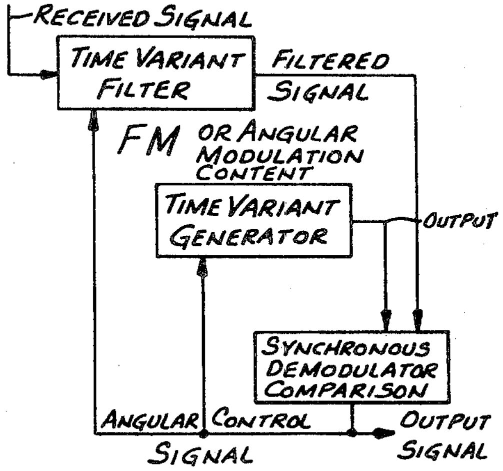
FIG. 4 is a generalized block diagram of a tracking filter network for use with FM or other angle modulated carrier signals only and provides independent amplitude and phase angle parameters from comparison of the modulation carrier signal and its matched carrier signal.

The circuit of FIG. 4 is for the filter tracking and detection of FM or other angular modulations only and it employs synchronous demodulation of the signal from the time variant filter with the matched signal from the time variant oscillator or generator. Any AM modulations present are canceled in the filter. These signals are compared by the synchronous demodulation to provide one instantaneous angular control for angular modulation variations and which is supplied through a high-gain servo loop to both the filter and the oscillator together for control of their respective angular or phase parameters.

The block diagram of FIG. 5 is more sophisticated in that two signals are generated from the time variant filter as well as the time variant oscillator. This network will accurately filter track AM signals or angular modulated signals or complex modulated signals and is a more detailed breakdown of FIGS. 1 and 2 in the form of one example embodiment. The received signal $Eg$ passes through the analog divider (which if desired may be thought of as part of the time variant filter) where it is operated upon by $x$, the control signal for the instantaneous amplitude axis of the divider and which contains the amplitude information content, and the signal becomes $Eg/x$ ($Eg$ substantially amplitude demodulated) which is sent on to the filter. The top signal $\overline{Ec}$ is the cosine function of filtered $Eg/x$ wherein $\overline{Y}$ is instant frequency ratio, the carrier frequency being instantaneously modulated in accordance with Y. The second signal from the time variant filter is $\overline{Es}$ a sine function of the filtered signal. The signals from the oscillator are complimentary generated matched signals being $Ec$ and $Es$. In the synchronous demodulator the signals $\overline{Es}$ and $Ec$ are supplied to one analog multiplier and $\overline{Ec}$ and $Es$ are supplied to a second analog multiplier and single signals of each are supplied to summing networks, to yield a phase error signal $Ey$ and amplitude error signal $Ex$ which may be differentiated to a $y$ and $x$ parameter control signal respectively for operating the instantaneous tracking frequencies of the filter and the oscillator and the instantaneous amplitude tracking magnitudes of the analog divider to follow the signal changes. The principle will be more clearly understood in connection with FIG. 6.

In FIG. 6, the signal to be filtered passes through an analog divider and a time variant filter having respective control signals $x$ and $y$ which operate the instantaneous amplitude and frequency or phase axes of the filter respectively. The analog divider is separated from the time variant filter block to aid the clarity of the illustration. A time variant oscillator which can produce frequency or angular modulated signals is used to generate a signal matched in frequency content to the filtered signal. The output of the filter and the output of the oscillator are introduced into a synchronous detector which produces a pair of output signals which are used to derive and the $x$ and $y$ axis control signals. One output of the synchronous detector is proportional to the phase difference between the filtered signal and the oscillator signal; while, the other output of the synchronous detector is proportional to the amplitude changes of the filtered signal.

FIG. 6 shows the synchronous detector containing four analog multipliers and two summing networks. Although this system is quite different from conventional phase locked loop tracking demodulators, some similarities may be found for purposes of understanding the system operation. The oscillator bears a signal output whose frequency is in proportion to the control signal $y$. Two analog multipliers and one summing network serve as a phase detector to produce a signal proportional to the phase difference between oscillator output and filter output. This phase error signal is then processed in a data filter and amplified to produce the control signal $y$. In this manner, the oscillator is thus phase locked to the output of the time variant filter. Another pair of analog multipliers and a summing network serve as an amplitude detector to produce a signal proportional to the amplitude of the output of the time variant filter. This signal is then used to vary the amplitude ratio of the analog divider so as to maintain constant amplitude at the output of the time variant filter. Although the use of four analog multipliers in the synchronous detector is quite elaborate compared to conventional means of phase and amplitude detection, this particular design permits complete carrier suppression without introducing time lags into the servo loops. In this manner, the servo loops may be operated with high-loop gains with excellent stability. The oscillator and the time variant filter are designed with the same component types and having a common control signal $y$. Thus, as the oscillator output is varied in accordance with the signal $y$, the time variant filter will have its center frequency instantaneously varied in accord, and only a very narrow band of frequencies will pass through the time variant filter centered about the oscillator frequency. This system differs from the conventional by having a carrier filter which is located ahead of the phase detector, and by having a wide bandwidth data filter, instead of the usual low-pass loop filter.

The time variant filter and the time variant oscillator are preferably identical as previously stated and as shown in FIG. 7.

Referring to FIG. 7 the time variant filter must have an additional input signal connection that is not required for the time variant oscillator. This difference is illustrated by switch or bar connector 10 which when engaged represents the filter, and the oscillator when disengaged. When switch 10 is engaged, input signal $Eg/x$ from the analog divider enters the filter via potentiometer 11 wherein $$\frac{Eg}{x} = A\left(\frac{\bar{x}}{x}\right) \cos \omega_0 \int y\,dt.$$

The summing or invertor input resistors 12, R3, R4 and R8 are connected to summation point 13 which is maintained at zero potential.

In both the filter and the oscillator, there are three amplifiers, 14, 18 and 21, in a loop series circuit. The first amplifier 14 forms a multiple input invertor with feedback resistance R1 and input resistors 12, R3, R4 and R8, that inverts the input signal 180° out of phase which provides at output 1 a cosine signal $$Ec = A\left(\frac{\bar{x}}{x}\right)_{\cos} \int \omega_0 \bar{y}\,dt$$

which is a positive signal, assuming at the present instance that the input signal to the invertor is represented as a negative cosine function.

The second amplifier 18 together with variable resistor 17 and capacitor C1 forms a first integrator 15. The variant $y$ filter parameter is provided by variable resistance 17 which is a controllable variable independent impedance means, or a variable impedance means, which includes any one of the following; a variable resistance, a variable reluctance, a variable inductance; a variable impedance; a variable capacitance; or a solid state computer controlled operative to substitute one unit of any one of the same or their combination. The variable is represented as $y$ and the impedance means as $R/y$. A controlled semiconductor device may be readily employed for impedance means 17. This integrator provides a second signal at 90° out of phase with the first signal at output 2 and is therefore represented as $$Es = A\left(\frac{\bar{x}}{x}\right) \sin \int \omega_0 \bar{y}\,dt.$$

The filter and oscillator described here in particular, comprise a closed loop series circuit of an invertor and two integrators.

The second integrator 16 is also provided with a time variant filter parameter $y$ indicated at 20. This second time variant parameter may be any one of the aforementioned controllable variant independent impedance means or a variable impedance means. The time variant parameter control is represented as the $y$ signal and the impedance means as R/$y$.

The second integrator feedback is indicated by the capacitor $C_2$. This integrator provides the third signal at output 3, 90° out of phase with the second signal and is represented by $$-E_c = -A\left(\frac{\bar{x}}{x}\right)\int \omega_0 \bar{y}\, dt.$$

As a filtered signal, these output signals are represented as $\bar{E}_c$, $\bar{E}_s$ and $-\bar{E}_c$ respectively.

As an oscillator output these signals are represented as $E_c$, $E_s$ and $-E_c$.

The first output signal $E_c$ is fed back through resistor R1 to summation point 13.

The second output signal $E_s$ is supplied to the point 22 through the resistor R2. This point is connected through resistor R3 to the summation point 13.

The second output signal $E_s$ is also supplied to the invertor represented by amplifier 23 and resistors R5 and R6, which provides a $-E_s$ negative damping signal through resistance R7 to the point 25 where the high value resistor R9 connects the same to ground and from also point 25 resistor R8 connects the same to the summation point 13. This negative damping signal is employed to prevent dampening of the filtered signal caused through dissipation of the signal energy in circuit components, by supplying the necessary correction to the summation point 13. In other words, the damping signal controls the degree of regeneration or resonance of the filter and thus its bandwidth.

The third output signal $-E_c$ is supplied from output 3 through the summation resistor R4 to point 13.

Each of the output signals are also connected to a common reference point 28. The first signal $E_c$ through rectifier D1, $E_s$ through rectifier D2; $-E_c$ through rectifier D3; and the dampening signal $-E_s$ through the rectifier D28. The common reference point 28 is connected to ground through filter capacitor $C_3$. Each of these four signals is supplied through its respective rectifier to point 28 90° out of phase with the next in the combined form therefore of a pulsating DC voltage which is filtered via capacitor $C_3$ and resistor R10 to provide a smooth DC voltage to be compared with the reference voltage of a positive 10 volts supplied to resistor R11.

Assume that constant A equals 5 volts, such that the voltage at point 28 is also normally 5 volts DC, if the voltage at point 28 becomes greater than 5 volts, then the output of the comparator consisting of amplifier 26, resistor R12 and capacitor $C_4$ is negative. If it is less than 5 volts then the output is positive.

The output signal of amplifier 26 is supplied through the resistance R13 to the gate of the switching or field affect transistor 27 the base D of which is connected to the stabilizer point 22 and the base S of which is connected to ground. A resistor R14 is connected in parallel with the bases D and S. Thus a negative signal from this amplifier 26 regulates the switch 27 by biasing it on to short out the resistance R14 to stabilize the filter and prevent it from oscillating on its own or setting up its own oscillations by applying the proper or necessary magnitude changes or corrections to the summation point 13.

Only the modulated carrier is passed through the filter due to the variable tracking permitted by the variable parameters 17 and 20 which are instantaneously controlled by the modulation content of the signal being filtered itself.

Another typical narrow bandwidth tracking filter of the present invention is shown in FIG. 8. This filter also has the properties of accepting a very narrow band of signals having complex modulation content. That is, the input signal to this filter has amplitude and frequency, angle or other phase varying information content. THe filter will allow only a very restricted bandwidth of energy to activate it and track the instantaneous modulation contents with a pair of simultaneous servos which lock on to the exact instantaneous waveform.

In FIG. 8, the signal to be filtered passes through a time variant filter having control signals $x$ and $y$ which operate the instantaneous amplitude and frequency axis of the filter. A time variant oscillator, preferably matched to the filter, which can produce amplitude-modulated-frequency-modulated signals is used to generate a signal similar to the incoming signal. The output of the filter and the output of the oscillator is phase and amplitude detected by four multipliers and two summing networks which produce the phase difference of the filtered and self generated signals and which also produce the amplitude product of these signals. These signals are then used to derive the $x$ and $y$ axis control signals.

Although quite different from conventional phase locked systems, some similarities can be found for purposes of understanding the operation of the system. The oscillator bears a signal output whose frequency is in proportion to the control signal $y$. The multipliers serve as a phase detector to produce the phase difference between oscillator output and filter output. This error signal is then processed in a filter and amplified to produce the control signal $y$. Hence the oscillator is phase locked to the output of the filter. This system also provides that amplitude variations be also detected and used to vary the oscillator output such that the product of the filter output amplitude and oscillator output amplitude shall instantaneously be unity. The elaborate phase detection apparatus, including four multipliers and three summing networks has complete carrier suppression without introducing time lags in the information signals. This system has very wide band response in its servo system and achieves filtering in a separate filter which is ahead of the phase detector, instead of the usual loop filter in phase locked loop systems.

To more fully understand the system operation, we will consider the incoming signal, $E_g$ which has both amplitude and frequency modulation content. $E_g$ may be represented as:

$$E_g = Ae^{n\int \bar{x} dt} \text{ Cosine } \omega_0 \int \bar{y}\, dt \qquad \text{Eq. (101)}$$

Where in equation 101, $A$ is the peak amplitude, a constant; $n$ is a small fixed constant, $\bar{x}$ is a time varying dimensionless variable which contains the amplitude information content; $\omega_o$ is the nominal carrier frequency, a constant; $\bar{y}$ is a time varying dimensionless variable which contains the frequency modulation information content; the integrals are the ordinary zero to $t$ time integrals where time is expressed in seconds. The variables $\bar{x}$ and $\bar{y}$ will be restricted to the following ranges:

$$-1 \leq \bar{x} \leq 1 \qquad \text{Eq.(102)}$$

and, $$0 < \bar{y} \leq B \qquad \text{Eq.(103)}$$

where $B$ is a large positive number. In general, $\bar{y}$ will be found to be bound close to unity, since $y$ is the actual instantaneous frequency ratio, that is the incoming frequency is proportional to $\bar{y}\omega_o$, and since usual modulation processes keep small relative changes in frequency. We will assume that the information content in $\bar{x}$ and $\bar{y}$ will have their highest frequencies well below the average carrier frequency, $\omega_o$. We may thus expect that the derivatives of these functions are well bound, and that the signals are continuous and single valued. We consider the units of $\bar{x}$ and $\bar{y}$ to be dimensionless, the units of $n$ to be one over time, the units of $\omega_o$ to be radians per second; and, A may be expressed in volts.

The input signal $E_g$ is introduced into the time variant filter which produces two output signals, $\bar{E}_c$ and $\bar{E}_s$. Any network which will adequately perform the mathematical function of the filter as indicated may be employed. The relationship between these signals is expressed by:

$$\bar{E}_c=\left[\frac{D-nx}{y\omega_0}+\frac{1}{Q}+\frac{y\omega_0}{D-nx}\right]^{-1}\bar{E}_g \quad \text{Eq. (104)}$$

and, $$-\bar{E}_s=\left[\frac{D-nx}{y\omega_0}\right]\bar{E}_c \quad \text{Eq. (105)}$$

where $D$ is the time differentiator, $Q$ is the electrical Q associated with second order tuned circuits, being dimensionless and a large positive constant; $n$ and $\omega_o$ are the same as described in equation 101; and $x$ and $y$ are self generated functions being very nearly $\bar{x}$ and $\bar{y}$ respectively.

When the operator D is found with a factor before it, it means to differentiate first and multiply afterwards. When the operator D is found in a fraction, it means that the quantity above and to the right will be operated upon.

Referring to FIG. 9, the bandwidth requirement for a normal communication channel is compared with that of the present invention. Curve A, illustrated in the upper portion of the figure, represents the conventional bandwidth required. to accommodate the frequency spectrum for normal AM radio broadcasting for example. The effective modulation spread is 20 kilocycles, or ±10 kilocycles from $f_o$ (carrier frequency), which is sufficiently broad to accommodate the important side band transmissions.

Curve B, in the bottom portion of the figure, represents the controlled filter tracking bandwidth or filter tracking bandwidth at one given instant. For clarity, only a few side bands D are illustrated.

Curve B thus gates the received signal such that, only that portion within the confines of the envelope B at that instant, is permitted to pass, thus excluding all other or remaining noise and extraneous signals found within the normal channel bandwidth of curve A, but outside the envelope or confines of curve B.

As the Q of a circuit is equal to $f_o/\Delta f$, it can be readily observed from curve B, that $\Delta f$ very nearly approaches zero and that the system Q then very nearly approaches ∞. As previously mentioned, it is only the present limitation of present day electronic components which prevents the system of the present invention from attaining its proven capabilities of infinite Q detection.

Reference is made to FIG. 10 which illustrates, in block diagram, an embodiment hereof suitable for detection of signals whose angular modulation content is small, such as found in ordinary amplitude modulation. In FIG. 10, a fixed filter is employed together with a time variant generator, synchronous demodulator and analog divider. This embodiment is simply a special case of the embodiment shown in other examples hereof such as in FIGS. 1, 2, 3, 4, and 5 excepting that no provision for angular control is incorporated in the filter, and that only limited variations in carrier frequency can be tracked by this particular embodiment; however, where AM only is encountered, this example embodiment hereof achieves excellent tracking and signal detection of very weak signals. In this embodiment, the bandwidth of the fixed filter is preferably chosen to include all expected variations of the incoming carrier.

Some further improvements over prior art AM signal detection are illustrated in the block diagram denoted as FIG. 11. In FIG. 11 a frequency converter, analog divider and time variant generator are employed with a matched fixed filter and oscillator together with a synchronous demodulator to filter track AM or complex modulated signals whose angular modulation content is very slow, such as in ordinary amplitude modulation. In this example embodiment hereof, the angular control signal is used to adjust a time variant generator and thereby convert the received signal to a fixed frequency phase-locked to said fixed generator. The constant frequency signal from the frequency divider is then amplitude demodulated in the analog divider and then passed through the aforesaid fixed filter which is then synchronous demodulation compared with the fixed generator signal to produce an amplitude control signal to operate the analog divider and the aforesaid angular control signal. This example embodiment preferably employs matched quartz crystal elements within the fixed filter and fixed generator.

It is to be noted that errors in the multipliers used in the synchronous demodulator will in certain very narrow bandwidth embodiments, hereof, limit the amount of gain that can be permitted in the $x$ and $y$ control axis. This is clear from considering that complete carrier suppression is not achieved in such instances and that the amount of stable gain permitted is limited to prevent oscillations at the carrier frequency. This may be overcome to a large degree by digital implementation of the multiplication functions in the synchronous demodulator. In some embodiments, hereof, the output signals of the filter and oscillator are sampled, converted to digital and then multiplied in digital form. The digital error signals are then used directly to digitally control the filter and oscillator or divider as the case may be or converted to analog and used as shown hereinabove.

In certain large systems embodiments, hereof, a stored program digital computer is employed with proper interface multiplexers, sample and hold, and analog to digital conversion equipment, which serves a number of separate channels of filters and attendant oscillators; the computer is used to set the control parameters of each channel. Digital implementation of the angular control axis is very useful in certain embodiments, hereof; since excellent tracking is achieved by digitally setting ladder resistance networks in the filter and oscillator to the same values and hence to the same frequency which insures precise tuning of the filter.

In certain embodiments hereof requiring matched tuning of oscillator and filter, it is to be noted that drift in filter or oscillator components may cause detuning of the filter and attenuation of the desired signal. This may be corrected by a number of suitable means, one example is shown in FIG. 12.

Reference is made to FIG. 12 which is a block diagram of one embodiment, hereof, which incorporates provisions to automatically correct for drift of electronic or other components incorporated in the time variant filter and oscillator, such that the filter and oscillator will be matched at all times.

In FIG. 12, the incoming signal passes through frequency divider to the input of the time variant filter. The time variant filter is equipped with an additional angular control means such that small drift corrections may be made for accurate matching to the oscillator. A phase detector compares the input and output of the filter such that a negligible phase error is found in the time variant filter at all times. The output of the phase detector passes through a loop filter and thus slowly controls the center frequency of the filter over a small percentage of its frequency range so as to provide low-phase shift to the tracked signal.

Since the tracked signal is locked to the oscillator, the filter and oscillator are therefore, phase-locked together and also to the incoming signal, all of which provides that tracking will occur even with component drift, and that very high Q may be employed in the system.

It is to be noted that great variety may be employed in erecting the component structures incorporated in various examples hereof or other embodiments not shown. For example, the analog divider shown in FIGS. 5, 6, 10, 11, 12 or otherwise described herein, may be constructed of an analog network, a gain controllable amplifier, a nonlinear controllable amplifier, or network, or a component structure other than an analog divider, for example, a controllable limiter, where a bias point is set by the amplitude control signal to perform amplitude demodulation thereby. Thus, any amplitude demodulator or means which substantially cancels the amplitude modulation variations to provide an amplitude error signal will suffice.

Furthermore, said analog divider may be employed in any portion of an applicable embodiment hereof prior to filter detection, or within the filter. For example, in FIG. 11, the analog divider may be removed and replaced ahead of the frequency converter such as to provide amplitude demodulation prior to frequency conversion. Similarly, great variety may be employed in the control axis and its transfer function, the examples shown being merely illustrative.

It is also to be noted in the example embodiments of FIGS. 6 and 8, wherein the synchronous detector is shown to contain paired analog multipliers and summing networks, that this synchronous detector or demodulator may be of a different basic structure or design and is shown for illustrative purposes only. In substitution thereof, one may employ various prior art detection structures. Other embodiments of the detection unit may of course not employ synchronous demodulation as shown.

This detector may, and preferably so in many applications, be composed of computer elements and furthermore may employ a mathematical structure entirely different from that illustrated; provided, of course, that the essentials of phase, frequency or other time axis demodulation are involved or incorporated for the time axis demodulation function required and that some sort of amplitude demodulation is included for those particular examples or applications requiring amplitude demodulation or detection.

Conventional phase-locked-loop detection heretofore known, provides only detection of FM intelligence and has the further inherent disadvantage that it does not have the ability to detect very rapid signal level changes. The present invention even in its most fundamental form, as for example the last mentioned embodiment which does not incorporate a filter (time variant or otherwise), clearly overcomes these inherent defects and provides complete amplitudes and phase locking capabilities not possible with conventional phase-locked-loop systems. More specifically, the method and apparatus of the present invention provide complex angular detection by which complete demodulation of a carrier is accomplished.

For example, the conventional phase-locked-loop system provides phase locked detection of a modulated carrier wherein the phase may be represented by $e^{j\omega t}$. However, the present invention provides a complex angular-locked-loop system which permits complex angular locked on detection of a complex modulated carrier wherein the angular content (which may be more than just phase) might be represented as $e^{\alpha+j\omega t}$. Thus, whether the modulated signal to be detected has intended complex modulation content or not, i.e. even if the signal to be detected has no intended complex modulated content imposed thereon, is far superior not only because of the added intelligence carrying capabilities of complex modulation, but further because a noncomplex modulated carrier is imparted with small unwanted complex modulations from outside incontrollable variables in any regard which the detection methods heretofore known cannot lock on to provide truly noise free detection. The additional step of filtering the complex modulated carrier either before or after (or partly before and partly after) complex detection may be added in accordance with the teachings of the present invention to even further enhance the inventive qualities thereof over the prior art to provide noise free detection which more truly provides infinite Q capabilities.

With or without the filter, the present invention provides the novel feature of complex angular-locked-on detection of modulated carriers which may only have amplitude, phase, frequency or other time axis intelligence modulated alone thereon or may contain intended complex modulation. Thus, the present invention provides absolute or positive locked on detection and not just mere phase locked detection. The invention further provides improved channel capacity over all prior art detection systems by the unique filtering capabilities as herein specified and claimed.

In the above specification, some emphasis would appear as being placed as describing this invention in relation to signal tracking. However, the use of this and similar terms is not intended to be limiting upon the invention, nor is this term to be taken as being applicable merely to communications.

This invention may of course be employed in any number of uses such as a computing system, or as a component in a larger system to achieve the described improvements herein, such as for example, as a feedback element in an amplification apparatus; or, as a coupling element, or signal transfer means where infinite Q coupling is desired for example; or, as an antenna structure; etc., or for any number of uses and employments hereof as may be clearly seen by one skilled in the art.

It is to be noted that any desired bandwidth may be achieved and thus any desired degree of signal to noise performance may be obtained by choice of components and arrangement thereof, all in accordance with the substantial invention disclosed herein, and that more particularly a method and means of true infinite Q detection is, hereby, set forth.

It is to be remembered that in any particular example embodiment, hereof, where electrical or electronic components are described or implied, that one skilled in the art may employ corresponding mechanical or other components, and that the improvements shown and described, herein, will apply also to the corresponding mechanical or other type of structure thereby resulting, all in accordance with this invention; and that the invention is, therefore, not limited to the particular embodiments shown and illustrated.

It is also to be noted that with analog and digital computing equipment, one or more of the embodiments shown and described may be partly or wholly synthesized upon said embodiment, hereof, will thereby perform in accordance with the descriptions hereinabove, and that great improvements are thus obtained in information and data processing.

It is therefore clear that various modifications may be made in each embodiment and type of embodiment described and shown herein without departing from the spirit and scope of the invention; and that the invention is therefore not limited to the particular embodiments described above and shown in the drawings, which are merely illustrative only and not limiting on the broad invention; and that various changes in design, structure, and arrangement may be made without departing from the spirit and scope of the appended claims.

In the following claims, the term "complex modulated carrier signal" and "modulated carrier signal" have the same measuring and may, for example, mean an AM or FM carrier with unwanted or unavoidable complex modulation content or a carrier with intentional complex modulation content or intelligence; or it may mean a carrier which contains only amplitude, angular or complex modulation content.

I claim:

1. A detector comprising a closed loop circuit including time variant filter means having variable filter parameters for the filtering out of unwanted noise and the passage of a valid signal from a received modulated signal to be detected, and dynamic feedback parameter control means operable to successively integrate said valid signal a plurality of times and compare the integrals to detect the noise and modulation of the valid signal being filtered and vary the parameters of said filter with the detected noise and modulation to filter track said valid signal.

2. A detector comprising:

a closed loop circuit including a time variant filter with an input and having dynamic variable loop gain control means and variable filter tracking parameter means for the exclusion of unwanted noise and the passage of a noiseless valid modulated signal in a received modulated signal to be detected, and noise detection means operable to successively integrate with reference to time said valid modulated signal a plurality of times and compare the integrals to discriminate said at the input of said filter;

feedback control means responsive to said detected noise to variably control said loop gain control means to correspondingly control the loop gain inversely to the amount of noise detected;

and demodulation feedback means operable to detect the modulation of said valid signal and correspondingly vary said filter tracking parameter means with said detected modulation to filter track said valid signal.

3. The detector of claim 2 wherein said dynamic loop gain control means includes an active element operable in response to a noise control signal produced by said feedback control means from said discriminated noise to accordingly vary the loop gain in said closed filter loop to exclude said noise.

4. The detector of claim 3 wherein said variable filter tracking parameter means is an active or passive variable impedance.

5. The detector of claim 2 wherein said demodulator includes a second closed loop circuit including a time variant generator having variable generator parameters operable to generate a signal matched to said valid signal and a synchronous demodulator to detect the complex modulation error between said generated signal and said valid signal to provide said demodulation and feedback means operable to vary said generator parameters in accordance with said demodulation.

6. The detector of claim 5 wherein said time variant generator is matched to said time variant filter.

7. A detector comprising: a closed loop circuit including a time variant generator to generate a signal matching a signal to be detected and a synchronous demodulator operable to compare said signals and detect the complex modulation error therebetween to provide an error signal; said time variant generator having dynamic gain control means and variable generator tracking parameter means for the exclusion of unwanted noise and generation of said matched signal; noise detection means operable to successively integrate said generated matched signal a plurality of times and compare the integrals to discriminate said noise; and feedback control means responsive to said detected noise to variably control said dynamic gain control means to correspondingly control the generator gain inversely to the amount of noise detected; said error signal being connected to correspondingly vary said generator tracking parameter means to continually generate said matched signal.

8. The detector of claim 7 characterized by filter means operable to filter unwanted noise from said signal to be detected to provide a valid noise-free modulated signal prior to demodulation.

9. The detector of claim 8 wherein said filter is a time variant filter having dynamic variable gain control means and variable filter-tracking parameter means for the exclusion of unwanted noise and the passage of said valid modulated signal and noise detection means operable to successively integrate said valid modulated signal a plurality of times and compare the integrals to discriminate said noise, feedback control means responsive to said detected noise to variably control said gain control means to correspondingly control the filter gain inversely to the amount of noise detected, said variable filter-tracking parameter means being variably responsive to said error signal to filter track said valid signal.

10. A detector comprising: a time variant filter including noise detection means operable to successively integrate a signal to be detected a plurality of times and compare the integrals to detect unwanted noise in said signal to be detected, feedback control means responsive to said detected noise to control the gain of said filter by correspondingly varying the filter gain inversely to the presence of said detected noise to thereby filter said signal by removing said noise; and demodulation means operable to demodulate said filtered signal.

11. The detector of claim 10 characterized by variable impedance means connected in said filter to receive said filtered signal and further filter track the same for demodulation by said demodulation means; said variable impedance means having variable impedance parameters connected for variable response to said detected modulation of said signal being filtered to correspondingly filter track the same.

12. The detector of claim 11 wherein said noise detection means includes a plurality of cascaded integrators to successively integrate said signal to be detected; said variable impedance means including a plurality of variable impedances regulating the inputs of said integrators respectively.

* * * * *